(12) United States Patent
Vaccalluzzo et al.

(10) Patent No.: US 10,256,723 B1
(45) Date of Patent: Apr. 9, 2019

(54) INTEGRATED CIRCUIT FEED FORWARD CIRCUIT WITH TRANSLINEAR CELL

(71) Applicant: TEXAS INSTRUMENTS INCORPORATED, Dallas, TX (US)

(72) Inventors: Marcello Vaccalluzzo, Catania (IT); Michael Ryan Hanschke, Dallas, TX (US); Salvatore Giombanco, Cassaro (IT)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/044,772

(22) Filed: Jul. 25, 2018

(51) Int. Cl.
 *G05F 1/10* (2006.01)
 *H02M 3/156* (2006.01)
 *H02M 1/00* (2006.01)

(52) U.S. Cl.
 CPC .... *H02M 3/156* (2013.01); *H02M 2001/0022* (2013.01)

(58) Field of Classification Search
 CPC H02M 3/156; H02M 2001/0029; G01K 7/01; G05F 3/30
 USPC ........... 327/58, 59, 512, 513, 534, 539, 543; 323/271–276
 See application file for complete search history.

(56) References Cited

U.S. PATENT DOCUMENTS

| 6,630,866 | B2 * | 10/2003 | Gibson | H03F 3/26 330/263 |
| 7,372,317 | B1 * | 5/2008 | Gerstenhaber | G05F 3/30 327/513 |
| 8,325,502 | B2 * | 12/2012 | Giombanco | H02M 1/36 363/21.08 |
| 2018/0013341 | A1 * | 1/2018 | You | H02M 1/4208 |

\* cited by examiner

*Primary Examiner* — Rajnikant B Patel
(74) *Attorney, Agent, or Firm* — Tuenlap Chan; Charles A. Brill; Frank D. Cimino

(57) ABSTRACT

A power factor correction (PFC) integrated circuit having a feed forward circuit. The feed forward circuit comprises a first current source, a second current source, and a third current source, a first bi-polar junction transistor (BJT), a second BJT, a third BJT, and a fourth BJT coupled together in a translinear cell, where the first current source is coupled to the first BJT, the second current source is coupled to the second BJT, and the third current source is coupled to the third BJT, a biasing network coupled to the first BJT and to the second BJT and configured to maintain equal collector-to-emitter voltage across the first BJT and the second BJT, where the feed forward circuit is configured to output a current based on a current of the first current source, a current of the third current source, and a current of the second current source.

20 Claims, 2 Drawing Sheets

INTEGRATED CIRCUIT FEED FORWARD CIRCUIT WITH TRANSLINEAR CELL

BACKGROUND

Electronic analog multipliers and dividers find application in input voltage feed-forward for direct current-to-direct current (DC-to-DC) converters, in output power control for voltage regulators, or other applications. A multiplier in examples is used as a variable current attenuator or variable current amplifier in automatic gain correction (AGC) circuits. In examples, multipliers are used in radio frequency circuits that use variable gain amplifiers and feedback to adjust amplifier gain to optimize signal amplitude for the input range of circuits processing the signal.

SUMMARY

In accordance with at least one example, an analog integrated circuit, comprises a first bipolar junction transistor (BJT), a second BJT having an emitter coupled to an emitter of the first BJT, a third BJT having an emitter coupled to a base of the first BJT, and a fourth BJT having an emitter coupled to a base of the second BJT and having a base coupled to a base of the third BJT. The analog integrated circuit also comprises a first n-channel metal oxide semiconductor field effect transistor (NMOSFET) having a source coupled to the first BJT, a second NMOSFET having a gate coupled to a gate of the first NMOSFET, a third NMOSFET having a gate coupled to the first NMOSFET, and a p-channel metal oxide semiconductor field effect transistor (PMOSFET) having a gate coupled to the second NMOSFET.

In accordance with at least one example, a power factor correction (PFC) integrated circuit having a feed forward circuit, comprises a first current source, a second current source, and a third current source. The PFC integrated circuit comprises a first bi-polar junction transistor (BJT), a second BJT, a third BJT, and a fourth BJT coupled together in a translinear cell, where the first current source is coupled to the first BJT, the second current source is coupled to the second BJT, and the third current source is coupled to the third BJT. The PFC integrated circuit comprises a biasing network coupled to the first BJT and to the second BJT and configured to maintain equal collector-to-emitter voltage across the first BJT and the second BJT. The feed forward circuit is configured to output a current from an emitter of the fourth BJT that is proportional to the product of a current of the first current source and a current of the third current source divided by a current of the second current source.

In accordance with at least one example, a power supply comprises a rectifier configured to receive electrical power from electrical mains, a power factor correction (PFC) integrated circuit coupled to the rectifier and having a feed forward circuit, and a direct current-to-direct current converter coupled to an output of the PFC integrated circuit. The feed forward circuit of the PFC integrated circuit comprises a first bi-polar junction transistor (BJT), a second BJT, a third BJT, and a fourth BJT, where an emitter of the first BJT is coupled to an emitter of the second BJT, an emitter of the third BJT is coupled to a base of the first BJT, an emitter of the fourth BJT is coupled to a base of the second BJT, and a collector of the third BJT is coupled to a collector of the fourth BJT forming a translinear cell. The feed forward circuit of the PFC integrated circuit comprises a dynamic biasing network coupled to the first BJT and to the second BJT and configured to maintain equal collector-to-emitter voltage across the first BJT and the second BJT.

BRIEF DESCRIPTION OF THE DRAWINGS

For a detailed description of various examples, reference will now be made to the accompanying drawings in which.

DETAILED DESCRIPTION

Figure 1:
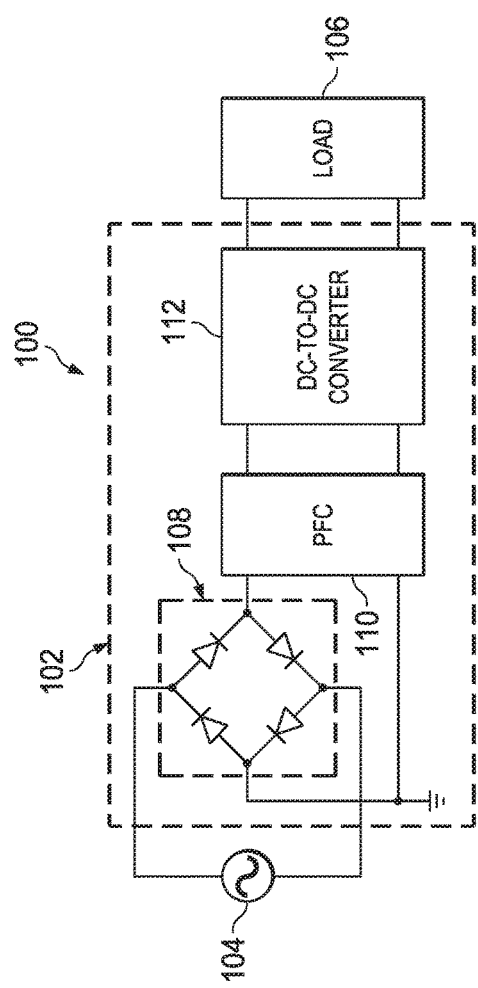
FIG. 1 shows an electric system in accordance with various examples.

A circuit comprising a translinear cell implements an analog multiplier/divider that provides an output signal, for example a current that is the product of the current in a first current source multiplied by the current in a third current source divided by the current in a second current source. The translinear cell is formed by suitably connecting four bipolar junction transistors (BJTs). More explicitly, the emitters of a first BJT and a second BJT are connected to each other, an emitter of the third BJT is connected to a base of the first BJT, an emitter of the fourth BJT is connected to a base of the second BJT, and a collector of the third BJT is connected to a collector of the fourth BJT. In accordance with the translinear principle, the product of the current in the collectors of the first and third BJT is equal to the product of the current in the collectors of the second BJT and the fourth BJT. Taking the current in the fourth BJT as a desired output of this circuit, the output current is equal to the product of the current in the collector of the first BJT (e.g., I1) and the current in the emitter of the third BJT (e.g., I3) divided by the current in the collector in the second BJT (e.g., I2). Non-ideal effects associated with the BJT transistors, for example the Early and BETA effects, introduce inaccuracies in the function of the circuit. In examples, the non-ideal effects are more evident when the dynamic range of the current in the current sources is large, possibly resulting in unacceptable inaccuracies. For example, significant differences in the collector-to-emitter voltage between the first BJT and the second BJT can introduce unbalanced Early effect in the circuit and create error in the output current.

The present disclosure teaches dynamic biasing that assures that the collector-to-emitter voltage of the first BJT and the collector-to-emitter voltage of the second BJT in this circuit remain substantially equal across the entire dynamic range of the current sources, which leads to the Early effects in each of the first BJT and the second BJT balancing each other out and not creating error in the output current (e.g., the output current does not depend on the Early effect). This dynamic biasing, as taught in more detail hereinafter, is achieved using circuitry that comprises a first N-channel metal oxide semiconductor field effect transistor (NMOSFET) having a source coupled to a collector of the first BJT and a drain coupled to the first current source and a second N-channel NMOSFET having a source coupled to a collector of the second BJT and a drain coupled to the second current source. The dynamic biasing further is achieved using circuitry that comprises a biasing current source, a biasing NMOSFET, and a biasing P-channel metal oxide field effect transistor (PMOSFET). A source of the biasing NMOSFET is coupled to a source of the biasing PMOSFET, a drain of the biasing NMOSFET is connected to a gate of the biasing NMOSFET, to a gate of the first NMOSFET, and to a gate of the second NMOSFET. A gate of the biasing PMOSFET is connected to the emitter of the first BJT and to the emitter of the second BJT. The present disclosure further teaches a current clamping circuit that restricts the current output of the analog multiplier/divider to a maximum value.

FIG. 1 depicts an electric system 100. The electric system 100 comprises electric power supply 102, alternating current (AC) electric power source 104, and electric load 106. The electric power supply 102 receives electric power from the AC electric power source 104 (e.g., electrical power mains) and provides conditioned direct current (DC) electric power to the load 106. In examples, the electric power supply 102 comprises a rectifier 108, a power factor correction (PFC) integrated circuit 110, and a DC-to-DC converter circuit 112. In examples, the DC-to-DC converter circuit 112 is an integrated circuit. The electric load 106 is a DC electric motor, an electronic device, or other electric apparatus that consumes DC electric power. While the rectifier 108 is illustrated in FIG. 1 as a full-wave rectifier, in other examples the rectifier 108 is a half-wave rectifier.

Figure 2:
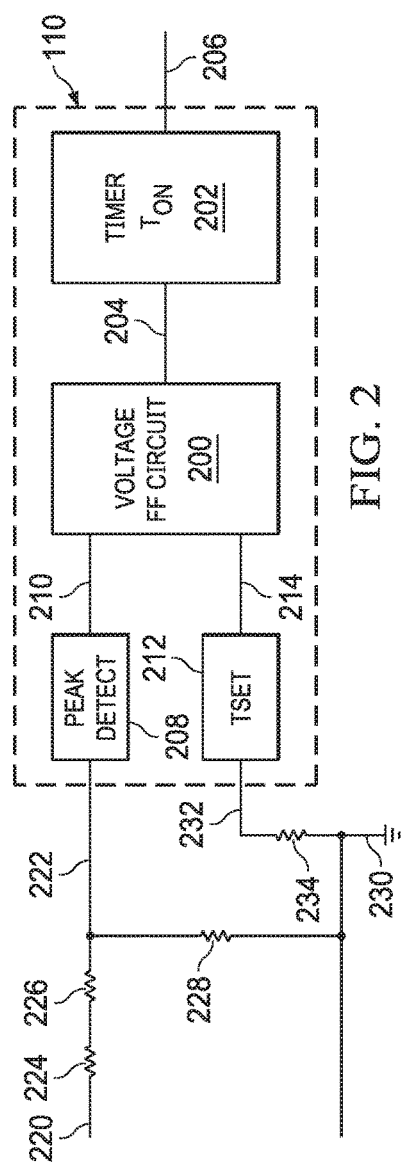
FIG. 2 shows a power factor correction integrated circuit in accordance with various examples.

FIG. 2 depicts the PFC integrated circuit 110 with coupling networks illustrated. In examples, the PFC 110 comprises a voltage feed forward circuit 200 that generates a feed forward current ($I_{ff}$) signal 204 that is coupled to a $t_{on}$ timer component 202 that outputs a PFC control ($t_{ON}$) signal 206. In examples, the PFC control signal 206 provides an output to the DC-to-DC converter circuit 112. In examples, the PFC 110 comprises a peak detector circuit 208 that provides a first input 210 to the voltage feed forward circuit 200 and a TSET component 212 that provides a second input 214 to the voltage feed forward circuit 200. In examples, a rectified DC power input 220 is coupled to a first input 222 of the PFC 110 via a first resistor 224 and a second resistor 226 and the first input 222 is coupled to an electrical ground source 230 through third resistor 228. In examples, a second input 232 of the PFC 110 is coupled to the electrical ground source 230 via a fourth resistor 234. The TSET component 212 forces a voltage VSET to the second input 232 of the PFC 110 and outputs the feed forward current signal 204 based on the current that flows out of the second input 232 (e.g., flows out of the second input 232 into the fourth resistor 234). In an example, TSET is a timing set input pin (e.g., the second input 232) of the PFC 110, and the TSET component 212 is coupled to the TSET input pin. The PFC control signal 206 ON time is proportional to the feed forward current signal 204. The network of resistors 224, 226, 228 promote the PFC 110 sensing a peak of the DC voltage present on the DC power line 220, for example a peak DC voltage output by the rectifier 108 of FIG. 1. In examples, the PFC 110 promotes achieving a power factor (e.g., a ratio of real electric power to reactive electric power, a measure of the phase relationship between voltage and current) close to 1.0 and hence maximizing active power.

Figure 3:
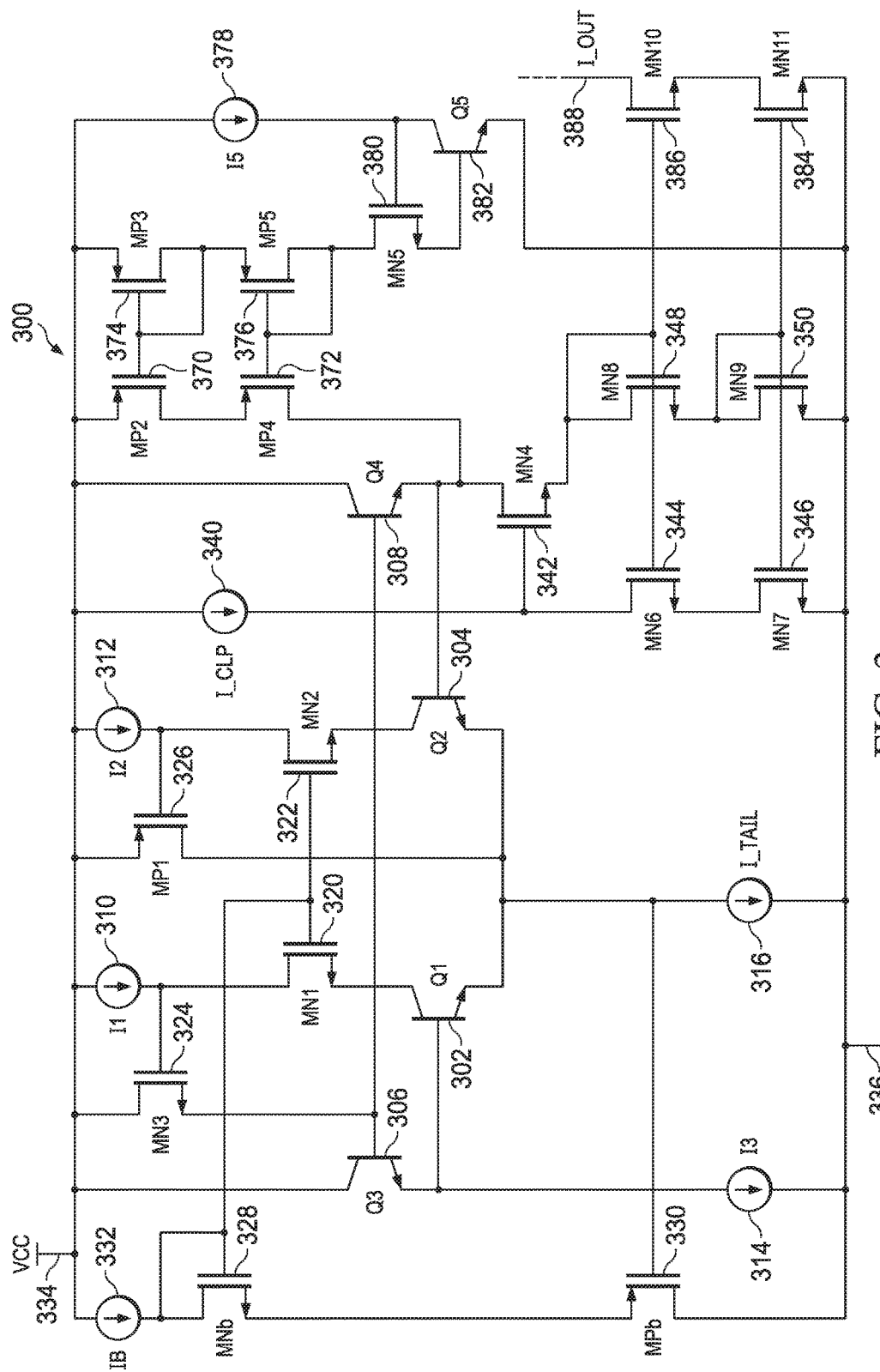
FIG. 3 shows an analog multiplier/divider circuit in accordance with various examples.

FIG. 3 shows an analog multiplier/divider circuit 300. In examples, the analog multiplier/divider circuit 300 is used as part of the voltage feed forward circuit 200 in the PFC integrated circuit 110. In other examples, the analog multiplier/divider circuit 300 is used in output power control for voltage regulators. In other examples, the analog multiplier/divider circuit 300 is used as a variable current attenuator or variable current amplifier in automatic gain correction (AGC) circuits.

In examples, the analog multiplier/divider circuit 300 comprises a first bi-polar junction transistor (BJT) 302, a second BJT 304, a third BJT 306, and a fourth BJT 308. An emitter of the first BJT 302 is connected to an emitter of the second BJT 304. A base of the first BJT 302 is connected to an emitter of the third BJT 306, and a base of the second BJT 304 is connected to an emitter of the fourth BJT 308. A base of the third BJT 306 is connected to a base of the fourth BJT 308. Thus, BJTs 302, 304, 306, 308 form a translinear cell. The sum of the base-to-emitter voltage of the third BJT 306 ($V_{BE3}$) and the base-to-emitter voltage of the first BJT 302 ($V_{BE1}$) is equal to the sum of the base-to-emitter voltage of the fourth BJT 308 ($V_{BE4}$) and the base-to-emitter voltage of the second BJT 304 ($V_{BE2}$):

$$V_{BE1}V_{BE3}=V_{BE2}V_{BE4} \quad \text{EQ1}$$

and hence, relying on the well-known BJT formula relating emitter current to an exponential in $V_{BE}$, $$I_E=c_1 e^{c_2 V_{BE}} \quad \text{EQ2}$$

the product of the emitter current of the first BJT 302 ($I_1$) and the emitter current of the third BJT 306 ($I_3$) is equal to the emitter current of the second BJT 304 ($I_2$) and the fourth BJT 308 ($I_4$).

$$I_1 \times I_3 = I_2 \times I_4 \quad \text{EQ3}$$

Dividing by $I_2$ gives:

$$(I_1 \times I_3)/I_2 = I_4 \quad \text{EQ4}$$

The translinear cell formed by BJTs 302, 304, 306, 308 provide the multiplications and divisions of the analog multiplier/divider circuit 300. Equation EQ2 above is derived from the Ebers-Moll equations assuming the BJT described by the equation is biased to work in its active mode (e.g., its base-emitter junction is forward biased and its base-collector junction is reverse biased) and neglecting the Early effect as a second order effect.

In examples, the circuit 300 comprises a first current source 310, a second current source 312, and a third current source 314. In examples, the current sources 310, 312, 314 are inputs to the analog multiplier/divider circuit 300. For example, a current I1 of the first current source 310 is proportional to a signal on the first input 210 to the voltage feed forward circuit 200, a current I2 of the second current source 312 is proportional to a signal on the second input 214 to the voltage feed forward circuit 200, and a current I3 of the third current source 214 is proportional to a signal on the first input 210 to the voltage feed forward circuit 200. The circuit further comprises a first n-channel metal oxide semiconductor field effect transistor (NMOSFET) 320 and a second NMOSFET 322. An input of the first current source 310 is coupled to a voltage source 334 (e.g., $V_{cc}$), and an output of the first current source 310 is coupled to a drain of the first NMOSFET 320. An input of the second current source 312 is coupled to the voltage source 334, and an output of the second current source 312 is coupled to a drain of the second NMOSFET 322. A source of the first NMOSFET 320 is coupled to a collector of the first BJT 302, and a source of the second NMOSFET 322 is coupled to a collector of the second BJT 304. A biasing network of the translinear cell (E.G., BJTs 302, 304, 306, 308) comprises the first NMOSFET 320 and the second NMOSFET 322.

In examples, the circuit 300 comprises a bias current source 332, a bias NMOSFET 328, and a bias p-channel metal oxide semiconductor field effect transistor (PMOSFET) 330, which can be considered part of the translinear cell. In examples, the biasing network of the translinear cell comprises the bias current source 332, the bias NMOSFET 328, and the bias PMOSFET 330. An input of the bias current source 332 is coupled to the voltage source 334, and an output of the bias current source 332 is coupled to a drain and a gate of the bias NMOSFET 328. The gate of the bias NMOSFET 328 is coupled to a gate of the first NMOSFET 320 and to a gate of the second NMOSFET 322. A source of the bias NMOSFET 328 is coupled to a source of the bias PMOSFET 330. A drain of the bias PMOSFET 330 is coupled to an electrical ground source 336, and a gate of the bias PMOSFET 330 is coupled to the emitter of the first BJT 302 and to the emitter of the second BJT 304. In examples, the circuit 300 comprises a tail current source 316 ($I_{TAIL}$) having an input coupled to the emitter of the first BJT 302 and to the emitter of the second BJT 304 and having an output coupled to the electrical ground source 336.

In examples, a first PMOSFET 326 provides a proper bias of the second BJT 304 by sourcing a current that is equal to the difference between the tail current source 316 and the currents provided by the first current source 310 and the second current source 312 (e.g., the first PMOSFET 326 sources current equal to $I_{TAIL}-I1-I2$). In examples, a third NMOSFET 324 and the third BJT 306 provide a feedback loop that promotes regulating the voltage drop across the first BJT 302 and across the first NMOSFET 320, whereby proper biasing is maintained. Additionally the third NMOSFET 324 sources current to bias both the third BJT 306 and the fourth BJT 308 without stealing current from another branch of the circuit 300.

In examples, the biasing network comprises the first PMOSFET 326 and the third NMOSFET 324. A source of the first PMOSFET 326 is coupled to the voltage source 334, a gate of the first PMOSFET 326 is coupled to the output of the second current source 312, and a drain of the first PMOSFET 326 is coupled to the emitter of the first BJT 302 and to the emitter of the second BJT 304. A drain of the third NMOSFET 324 is coupled to the voltage source 334, a gate of the third NMOSFET 324 is coupled to the output of the first current source 310, and a source of the third NMOSFET 324 is coupled to the base of the third BJT 306 and to the base of the fourth BJT 308.

In examples, a current (I4) flowing in the emitter of the fourth BJT 308 is considered an output of the circuit 300 and is proportional to the product of the current supplied by the first current source 310 times the current supplied by the third current source 314 divided by the current supplied by the second current source 312. In an example, the current (I4) flowing in the emitter of the fourth BJT 308 is equal to the product of the current supplied by the first current source 310 times the current supplied by the third current source 314 divided by the current supplied by the second current source 312. In examples, the current output by the first current source 310 is substantially equal to the current (I1) flowing in the emitter of the first BJT 302, the current output by the third current source 314 is substantially equal to the current (I3) flowing in the emitter of the third BJT 306, and the current output by the second current source 312 is substantially equal to the current (I2) flowing in the emitter of the second BJT 304. In examples, the currents in the current sources 310, 312, 314 vary over a ratio of 1:40, over a ratio of 1:60, over a ratio of 1:80, over a ratio of 1:100, over a ratio of 1:120, or over some other ratio. In examples, the currents in the current sources 310, 312, 314 vary over a range from 0.5 uA (microampere) to 40.0 uA. In other examples, other ranges of currents are supported by the current sources 310, 312, 314. To avoid the circuit 300 outputting or commanding excessive electrical current, the output current is clamped to a maximum value $I_{CLAMP}$.

The biasing network associated with the translinear cell formed by BJTs 302, 304, 306, 308 and comprising bias NMOSFET 328 and bias PMOSFET 330 provides dynamic biasing for first NMOSFET 320 and second NMOSFET 322, which are configured as source followers. This biasing network assures that during operation the collector-to-emitter voltage ($V_{CE}$) of the first BJT 302 and the collector-to-emitter voltage of the second BJT 304 are substantially equal. Because $V_{CE}$ for both the first and second BJTs are equal, the Early effect in the first BJT 302 and in the second BJT 304 effectively balance each other out, making the output of the circuit 300 more accurate even with when operating with a wide dynamic range of input currents.

In examples, the circuit 300 comprises a clamp current source 340 ($I_{CLAMP}$), a fourth NMOSFET 342, a sixth NMOSFET 344, a seventh NMOSFET 346, an eighth NMOSFET 348, a ninth NMOSFET 350, a tenth NMOSFET 386, and an eleventh NMOSFET 384. In examples a clamp network comprises the clamp current source 340, the fourth NMOSFET 342, the sixth NMOSFET 344, the seventh NMOSFET 346, the eighth NMOSFET 348, and the ninth NMOSFET 350.

An input of the clamp current source 340 is coupled to the voltage source 334, and an output of the clamp current source 340 is coupled to a gate of the fourth NMOSFET 342 and to a drain of the sixth NMOSFET 344. A drain of the fourth NMOSFET 342 is coupled to an emitter of the fourth BJT 308, and a source of the fourth NMOSFET 342 is coupled to a gate of the sixth NMOSFET 344, to a drain of the eighth NMOSFET 348, to a gate of the eighth NMOSFET 348, and to a gate of the tenth NMOSFET 386. A source of the sixth NMOSFET 344 is coupled to a drain of the seventh NMOSFET 346. A source of the seventh NMOSFET 346 is coupled to the electrical ground source 336. A source of the eighth NMOSFET 348 is coupled to a gate of the seventh NMOSFET 346, to a drain of the ninth NMOSFET 350, to a gate of the ninth NMOSFET 350, and to a gate of the eleventh NMOSFET 384. A source of the ninth NMOSFET 350 is coupled to the electrical ground source 336. A source of the eleventh NMOSFET 384 is coupled to the electrical ground source 336. A source of the tenth NMOSFET 386 is coupled to a drain of the eleventh NMOSFET 384, and a drain of the tenth NMOSFET 386 is coupled to an output 388 of the circuit 300. In examples, the output 388 is a current I_OUT that is equal to the minimum of the current produced by clamp current source 340 (e.g., $I_{CLAMP}$) and the emitter current of fourth BJT 308.

The eleventh NMOSFET 384 is a current mirror to the seventh NMOSFET 346 and the ninth NMOSFET 350. When the current in the emitter of the fourth BJT 308 is not greater than a threshold current, the current output 388 is equal to the current in the emitter of the fourth BJT 308. When the current in the emitter of the fourth BJT 308 is above the threshold (e.g., above the current output of the clamp current source 340), the gate-to-source voltage (Vgs) of the fourth NMOSFET 342 is reduced such that the current through the fourth NMOSFET 342 is equal to Iclamp (e.g., by reducing the gate-to-source voltage (Vgs) of the fourth NMOSFET 342, the resistance of fourth NMOSFET 342 is increased and as a result the current through the fourth NMOSFET 342 is reduced to $I_{clamp}$). Thus, the current flowing in the eighth NMOSFET 348 and the ninth NMOSFET 350 is equal to Iclamp, and that current (e.g., equivalent of Iclamp) is mirrored by the tenth NMOSFET 386 and the eleventh NMOSFET 384, and thus the output current 388 is equal to the current provided by the clamp current source 340 ($I_{CLAMP}$). In some contexts, the tenth NMOSFET 386 and the eleventh NMOSFET 384 are referred to as an output current driver.

A current clamp circuit comprises the NMOSFETS 342, 344, 346, 348, 350, and the clamp current source 340. This current clamp circuit acts externally to the translinear cell formed by BJTs 302, 304, 306, 308 and therefore does not disturb the frequency compensation for the translinear cell. Additionally, the clamp loop is easy to compensate, due to its being external to the translinear cell.

In examples, the circuit 300 comprises a second PMOSFET 370, a third PMOSFET 374, a fourth PMOSFET 372, a fifth PMOSFET 376, a fifth NMOSFET 380, a fifth BJT 382, and a fifth current source 378 (I5). The current sourced by the fifth current source 378 is equal to the current sourced by the second current source 312 (e.g., I2=I5). A source of the second PMOSFET 370 is coupled to the voltage source 334, a gate of the second PMOSFET 370 is coupled to a gate of the third PMOSFET 374, and to a source of the fifth PMOSFET 376, and a drain of the second PMOSFET 370 is coupled to a source of the fourth PMOSFET 372. A source of the third PMOSFET 374 is coupled to the voltage source 334. A gate of the fourth PMOSFET 372 is coupled to a gate of the fifth PMOSFET 376 and to a drain of the fifth NMOSFET 380, and a drain of the fourth PMOSFET 372 is coupled to the emitter of the fourth BJT 308 and to the drain of the fourth NMOSFET 342. A collector of the fifth BJT 382 is coupled to the output of the fifth current source 378 and to a gate of the fifth NMOSFET 380, a base of the fifth BJT 382 is coupled to a source of the fifth NMOSFET 380, and an emitter of the fifth BJT 382 is coupled to the electrical ground source 336. The fifth BJT 382, fifth NMOSFET 380, and PMOSFETs 370, 374, 372, 376 replicate and compensate for the current flowing in the base of the second BJT 304, in order to decrease output error due to a finite beta of the second BJT 304.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means+/−10 percent of the stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. An analog integrated circuit, comprising:
   a first bipolar junction transistor (BJT);
   a second BJT having an emitter coupled to an emitter of the first BJT;
   a third BJT having an emitter coupled to a base of the first BJT;
   a fourth BJT having an emitter coupled to a base of the second BJT and having a base coupled to a base of the third BJT;
   a first n-channel metal oxide semiconductor field effect transistor (NMOSFET) having a source coupled to the first BJT;
   a second NMOSFET having a gate coupled to a gate of the first NMOSFET;
   a third NMOSFET having a gate coupled to the first NMOSFET; and
   a p-channel metal oxide semiconductor field effect transistor (PMOSFET) having a gate coupled to the second NMOSFET.

2. The integrated circuit of claim 1, further comprising a bias NMOSFET having a drain and a gate coupled to the gate of the first NMOSFET and to the gate of the second NMOSFET.

3. The integrated circuit of claim 2, further comprising a bias PMOSFET having a source coupled to a source of the bias NMOSFET, a gate coupled to the emitter of the first BJT and to the emitter of the second BJT, and a drain coupled to an electrical ground source.

4. The integrated circuit of claim 3, further comprising a first current source having an input coupled to a voltage source and an output coupled to a drain of the first NMOSFET, a second current source having an input coupled to the voltage source and an output coupled to a drain of the second NMOSFET, a third current source having an input coupled to the emitter of the third BJT and an output coupled to a ground source, and a bias current source having an input coupled to the voltage source and an output coupled to the drain and the gate of the bias NMOSFET.

5. The integrated circuit of claim 1, further comprising a tail current source having an input coupled to the emitter of the first BJT and to the emitter of the second BJT and an output coupled to a ground source.

6. The integrated circuit of claim 1, further comprising a current clamp circuit comprising a clamp current source, a fourth NMOSFET, a fifth NMOSFET, a sixth NMOSFET, a seventh NMOSFET, and an eighth NMOSFET, where the clamp current source has an input coupled to a voltage source and an output coupled to a gate of the fourth NMOSFET and to a drain of the fifth NMOSFET, where a drain of the fourth NMOSFET is coupled to the emitter of the fourth BJT and to the base of the second BJT, where a source of the fourth NMOSFET is coupled to a drain and a gate of the seventh NMOSFET and to a gate of the fifth NMOSFET, where a source of the fifth NMOSFET is coupled to a drain of the sixth NMOSFET, where a source of the sixth NMOSFET is coupled to a ground source, where a source of the seventh NMOSFET is coupled to a drain and a gate of the eighth NMOSFET and to a gate of the sixth NMOSFET, and where a drain of the eighth NMOSFET is coupled to the ground source.

7. The integrated circuit of claim 6, further comprising an output current driver comprising a ninth NMOSFET and a tenth NMOSFET, where a gate of the tenth NMOSFET is coupled to the source of the seventh NMOSFET, where a source of the tenth NMOSFET is coupled to the ground source, where a drain of the tenth NMOSFET is coupled to a source of the ninth NMOSFET, and where a gate of the ninth NMOSFET is coupled to the gate of the seventh NMOSFET.

8. The integrated circuit of claim 6, further comprising a second PMOSFET, a third PMOSFET, a fourth PMOSFET, a fifth PMOSFET, an eleventh NMOSFET, a fifth BJT, and a fourth current source, where a source of the second PMOSFET is coupled to the voltage source, a drain of the second PMOSFET is coupled to a source of the fourth PMOSFET, and a gate of the second PMOSFET is coupled to a gate of the third PMOSFET, to a drain of the third PMOSFET, and to a source of the fifth PMOSFET, where a source of the third PMOSFET is coupled to the voltage source, where a drain of the fourth PMOSFET is coupled to the emitter of the fourth BJT, to the base of the second BJT, and to the drain of the fourth NMOSFET, where a gate of the fourth PMOSFET is coupled to a gate of the fifth PMOSFET, to a drain of the fifth PMOSFET, and to a drain of the eleventh NMOSFET, where an input of the fourth current source is coupled to the voltage source and an output of the fourth current source is coupled to a gate of the eleventh NMOSFET and to a collector of the fifth BJT, where a source of the eleventh NMOSFET is coupled to a base of the fifth BJT, and where an emitter of the fifth BJT is coupled to the ground source.

9. A power factor correction (PFC) integrated circuit, comprising:
a first current source, a second current source, and a third current source;
a first bi-polar junction transistor (BJT), a second BJT, a third BJT, and a fourth BJT coupled together in a translinear cell, where the first current source is coupled to the first BJT, the second current source is coupled to the second BJT, and the third current source is coupled to the third BJT;
a biasing network coupled to the first BJT and to the second BJT and configured to maintain equal collector-to-emitter voltage across the first BJT and the second BJT; and
a feed forward circuit is configured to output a current from an emitter of the fourth BJT that is proportional to the product of a current of the first current source and a current of the third current source divided by a current of the second current source.

10. The PFC integrated circuit of claim 9, wherein the biasing network comprises a first n-channel metal oxide semiconductor field effect transistor (NMOSFET) and a second NMOSFET, where a gate of the first NMOSFET is coupled to a gate of the second NMOSFET, where a drain of the first NMOSFET is coupled to an output of the first current source and a source of the first NMOSFET is coupled to a collector of the first BJT, where a drain of the second NMOSFET is coupled to an output of the second current source and a source of the second NMOSFET is coupled to a collector of the second BJT.

11. The PFC integrated circuit of claim 10, where the biasing network comprises a biasing NMOSFET and a biasing current source, where an output of the biasing current source is coupled to a drain and a gate of the biasing NMOSFET and to the gate of the first NMOSFET and to the gate of the second NMOSFET.

12. The PFC integrated circuit of claim 9, further comprising a tail current source having an input coupled to an emitter of the first BJT and to an emitter of the second BJT and having an output coupled to a ground source.

13. The PFC integrated circuit of claim 9, comprising a current clamp circuit comprising a clamp current source having an input coupled to a voltage source and an output coupled to an emitter of the fourth BJT through a clamp network of five NMOSFETS.

14. The PFC integrated circuit of claim 13, where the clamp network comprises a fourth NMOSFET, a fifth NMOSFET, a sixth NMOSFET, a seventh NMOSFET, and an eighth NMOSFET, where the clamp current source output is coupled to a gate of the fourth NMOSFET and to a drain of the fifth NMOSFET, where a drain of the fourth NMOSFET is coupled to the emitter of the fourth BJT, where a source of the fourth NMOSFET is coupled to a drain and a gate of the seventh NMOSFET and to a gate of the fifth NMOSFET, where a source of the fifth NMOSFET is coupled to a drain of the sixth NMOSFET, where a source of the sixth NMOSFET is coupled to a ground source, where a source of the seventh NMOSFET is coupled to a drain and a gate of the eighth NMOSFET and to a gate of the sixth NMOSFET, and where a drain of the eighth NMOSFET is coupled to the ground source.

15. The PFC integrated circuit of claim 14, further comprising an output current driver comprising a ninth NMOSFET and a tenth NMOSFET, where a gate of the tenth NMOSFET is coupled to the source of the seventh NMOSFET, where a source of the tenth NMOSFET is coupled to the ground source, where a drain of the tenth NMOSFET is coupled to a source of the ninth NMOSFET, and where a gate of the ninth NMOSFET is coupled to the gate of the seventh NMOSFET.

16. A power supply comprising:
a rectifier configured to receive electrical power from electrical mains;
a power factor correction (PFC) integrated circuit coupled to the rectifier and having a feed forward circuit comprising:
a first bi-polar junction transistor (BJT), a second BJT, a third BJT, and a fourth BJT, where an emitter of the first BJT is coupled to an emitter of the second BJT, an emitter of the third BJT is coupled to a base of the first BJT, an emitter of the fourth BJT is coupled to a base of the second BJT, and a collector of the third BJT is coupled to a collector of the fourth BJT forming a translinear cell,
a dynamic biasing network coupled to the first BJT and to the second BJT and configured to maintain equal collector-to-emitter voltage across the first BJT and the second BJT; and
a direct current-to-direct current converter coupled to an output of the PFC integrated circuit.

17. The power supply of claim 16, wherein the feed forward circuit is configured to output a current from the emitter of the fourth BJT that is proportional to the product of a current of a first current source coupled to the collector of the first BJT with a current of a third current source coupled to the emitter of the third BJT and divided by a current of a second current source.

18. The power supply of claim 17, where the dynamic biasing network comprises a first n-channel metal oxide semiconductor field effect transistor (NMOSFET) and a second NMOSFET, where a gate of the first NMOSFET is coupled to a gate of the second NMOSFET, where a drain of the first NMOSFET is coupled to an output of the first current source and a source of the first NMOSFET is coupled to a collector of the first BJT, where a drain of the second NMOSFET is coupled to an output of the second current source and a source of the second NMOSFET is coupled to a collector of the second BJT.

19. The power supply of claim 16, wherein the feed forward circuit comprises a current clamp configured to restrict a current in the output of the PFC integrated circuit to a maximum value.

20. The power supply of claim 16, wherein the rectifier is a full-wave rectifier.

* * * * *